United States Patent [19]

Baggett

[11] Patent Number: 4,569,809
[45] Date of Patent: Feb. 11, 1986

[54] DEVICE FOR ALIGNING A CUTTER ASSEMBLY SHAFT RELATIVE TO A DIE FACE OF AN UNDERWATER PELLETIZER

[75] Inventor: John W. Baggett, Lake Jackson, Tex.

[73] Assignee: Standard Oil Company (Indiana), Chicago, Ill.

[21] Appl. No.: 676,523

[22] Filed: Nov. 30, 1984

[51] Int. Cl.⁴ ............... B28B 17/00; B29B 1/03; B29C 3/00
[52] U.S. Cl. ................ 264/40.1; 264/142; 425/142; 425/292
[58] Field of Search ........... 264/40.1, 142; 425/142, 425/292

[56] References Cited

U.S. PATENT DOCUMENTS

| | | | |
|---|---|---|---|
| 3,389,204 | 6/1968 | Hafliger | 264/142 |
| 3,912,434 | 10/1975 | Nagahara et al. | 425/142 |
| 4,290,742 | 9/1981 | Scharer et al. | 264/142 X |
| 4,321,026 | 3/1982 | Lambertus | 425/142 |
| 4,470,791 | 9/1984 | Tanaka et al. | 264/142 X |
| 4,514,348 | 4/1985 | Iguchi et al. | 264/40.1 |

Primary Examiner—J. Howard Flint, Jr.
Attorney, Agent, or Firm—Wallace L. Oliver; William T. McClain; William H. Magidson

[57] ABSTRACT

The alignment device or jig is utilized in aligning a shaft of a pelletizer perpendicular with a die face and includes a sensing/scraping assembly which is adapted to travel on a die face and scrape polymer drool off the die face until a scraping edge of the assembly is in constant contact with the die face during rotation of the jig on the shaft of the pelletizer. The scraping edge is mounted on the end of a rod which is spring biased toward the die face and which is axially movable in a bore in the jig and movement of the rod indicates nonperpendicularity of the shaft to the die face. After adjusting the skew of the shaft, cessation of movement of the rod in the bore in the jig will indicate a true perpendicularity of the shaft to the die face.

15 Claims, 6 Drawing Figures

DEVICE FOR ALIGNING A CUTTER ASSEMBLY SHAFT RELATIVE TO A DIE FACE OF AN UNDERWATER PELLETIZER

BACKGROUND OF THE INVENTION

1. Field of the Invention

The present invention relates to a device for aligning a shaft of a cutting assembly of an underwater pelletizer perpendicular to a die face in the pelletizer and more particularly to an aligning jig at the distal end of which is provided a scraper/sensor assembly. The assembly is provided with a sensor having a scraping edge to scrape low viscosity polymer drool from the die face to assure proper determination of the position of the die face so that the shaft of the cutting assembly associated therewith can be placed exactly perpendicular to the determined position of the die face.

2. Description of the Prior Art

Heretofore, in the procedure for perpendicularly aligning a shaft of a cutting assembly in a pelletizer relative to a die face in the pelletizer, a probe assembly has been utilized for determining the position of the die face. However, problems have arisen in ensuring a true reading or determination of the position of the die face due to the drool of low viscosity polymer along the die face between extrusion holes in the die face. The drool causes a probe to ride up and down relative to the die face making it very difficult to correctly determine the position of the die face relative to the shaft as the probe travels along a sweeping circular path on the die face and rides along over the drool rather than riding on the surface of the die face. In this respect, the polymer drool forms a thick coating on the die face and the probe is not supplied with any means with which it can cut through the drool to be positioned in direct contact with the die face. Such improper determination of die face position results in an incorrect alignment of the shaft of the cutting assembly which should be absolutely perpendicular to the die face so that uniformity in wear on the blades and/or die face is obtained and so that uniformity of the product (pellets) is achieved.

Various alignment techniques for aligning a shaft of a cutting assembly perpendicularly with a die face have been proposed and examples of such techniques are found in the following U.S. Patents:

| U.S. Pat. No. | PATENTEE |
|---|---|
| 4,021,176 | Dettmer, et al. |
| 4,179,255 | Hale |
| 4,184,833 | Buchan, et al. |
| 4,260,356 | Fujiwara, et al. |
| 4,285,652 | Anders |
| 4,290,742 | Scharer, et al. |

The Dettmer, et al. U.S. Pat. No. 4,021,176 discloses a rotating cutter for use in a pelletizer. The cutter knives are resiliently tensioned toward a die face and the cutter is adjustably mounted relative to the die in a manner to effectively minimize thermal movement of the die relative to the cutter.

The Hale U.S. Pat. No. 4,279,255 discloses a knife holder of a melt cutter apparatus which allows limited free movement of knife blades so that essentially the full length of the knife contacts the die. The limited free rotation provided coupled with low inertia of light weight flexible knives, assures contact of the knives on the die even with possible slight die deflections and nonperpendicularity of cutter drive shaft to the die face.

The Buchan, et al. U.S. Pat. No. 4,184,833 discloses a knife adjustment system comprising a knife carrier rotatably supported on a quill which is positioned on a stationary cylindrical hub which extends outwardly from a die face. A knife carrier is provided for rotation about the quill with the quill being adjustable longitudinally with respect to the hub to move the quill for adjusting the spacing between knife blades and the extruder die face.

The Fujiwara, et al. U.S. Pat. No. 4,260,356 discloses a cutting tool in a plastic dispensing apparatus which is spring biased against the surface of an extrusion block. The cutting tool further is mounted by means of a connector to a drive shaft. The connector is adapted to allow tilting of the tool to maintain a cutting edge of a blade flat against the flat surface of the extrusion block.

The Anders U.S. Pat. No. 4,285,652 discloses a gap measuring instrument with a scale which may be mounted on a blade holder of a cutting assembly. The instrument is adapted to make a complete revolution and from a reading of the gap, the position of the blades can be brought into alignment with a cutting plate by manipulating a swivel type mounting of the cutting assembly. The gap measuring instrument is not further defined.

The Scharer, et al. U.S. Pat. No. 4,290,742 discloses adjusting means for aligning the cutting plane of a set of knives with the surface of a perforated die plate of a pelletizer. The adjusting means include a ring having a wedge cross section adjustable between the mountings for the plate and the knives to vary the angular relation of the mountings.

As will be described in greater detail hereinafter, the alignment device of the present invention, comprising an alignment jig having a scraper/sensor assembly which can scape away the drool from the die face while a determination of the position of the die face is being made enables one to make a more accurate determination of die face position relative to the axis of a shaft of a cutter assembly than is provided with the prior art systems and probes referred to above.

SUMMARY OF THE INVENTION

According to the invention, there is provided for use in a pelletizer having a die assembly with a die face through which fluid polymer flows under pressure and a cutter assembly mountable on a rotating shaft and positionable at or adjacent to the die face with cutting blades thereof positioned closely adjacent to or at the die face for cutting pellets from the polymer material flowing through holes in the die: a cutter assembly alignment jig comprising a hub mountable on the rotatable shaft for the cutter assembly; an arm extending radially outwardly from said hub to a distal end portion of said arm; said distal end portion having a throughbore extending therethrough; said throughbore having an axis parallel to the axis of the shaft of the cutter assembly; a rod received in said throughbore; means for resiliently biasing said rod toward said die face; and scraping/sensing means mounted on a forward end of said rod and having a scraping edge contacting the die face for scraping drool of polymer material off the die face and for sensing the position of the die face, such that the continuous contact of said scraping edge with the die face facilitates accurate measuring of the perpendicularity of the rotatable shaft to the plane of the die face.

Further according to the invention, there is provided a method for using a cutter assembly alignment jig of the type comprising: a hub mountable on the rotatable shaft for the cutter assembly; an arm extending radially outwardly from said hub to a distal end of said arm; said distal end portion having a throughbore extending therethrough; said throughbore having an axis parallel to the axis of the shaft of the cutter assembly; a rod received in said throughbore; means for resiliently biasing said rod toward said die face; and scraping/sensing means mounted on a forward end of said rod and having a scraping edge contacting the die face for scraping drool of polymer material off the die face and for sensing the position of the die face such that the continuous contact of said scraping edge with the die face facilitates accurate measuring of the perpendicularity of the rotatable shaft to the plane of the die face, said method including the steps of:

(a) heating the die face;
(b) mounting said jig on said cutter assembly shaft;
(c) holding said rod away from the die face against the action of said biasing means;
(d) positioning the jig so that said scraping edge is approximately ⅛ inch from the die face;
(e) securing the jig to the shaft;
(f) releasing said rod so that said biasing means bias said scraping edge toward the die face to bring the scraping edge against the die face;
(g) rotating the shaft and jig thereon to determine if the shaft is "true" perpendicular relative to the plane of the die face;
(h) recording changes in movement of said rod toward or away from the die face;
(i) determining generally the radial direction of the skew of the shaft;
(j) determining the direction and distance which the shaft should be moved relative to the die face to provide a truer perpendicularity of the shaft to the plane of the die face;
(k) holding the rod away from the heated die face against the action of the biasing means;
(l) making a small adjustment of the position of the shaft toward a determined new position thereof providing a "truer" perpendicularity of the shaft to the plane of the die face; and
(m) repeating steps (f) through (l) until a substantially continuous constant position indication is sensed by said scraping/sensing means which indicates a true perpendicularity of the shaft to the plane of the die face.

DESCRIPTION OF THE PREFERRED EMBODIMENT

Figure 1:
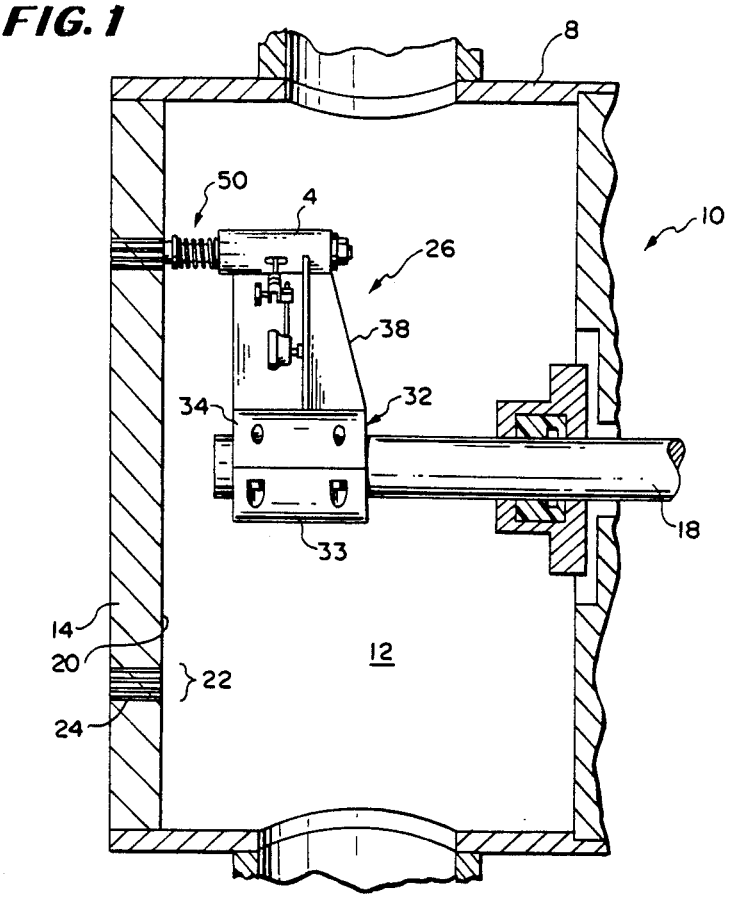
FIG. 1 is a generally vertical sectional view through a water jacket of a pelletizer and generally around an axis of a rotatable shaft of the pelletizer, and shows a die face and the alignment jig of the present invention mounted on the rotatable shaft of a cutter assembly.

Referring now to the drawings in greater detail, there is illustrated in FIG. 1 a water jacket 8 of a pelletizer 10. The jacket 8 surrounds a cutting area 12 adjacent a die 14. A cutter assembly (not shown) is adapted to be mounted on a rotatable cutter shaft 18 of the pelletizer 10 and positioned at or adjacent a die face 20 of the die 14. More specifically, the cutter assembly comprises a plurality of cutter blades (not shown) and is adapted to travel in a circular path adjacent a circular surface portion 22 of the die face 20 for cutting streams of fluid polymer (not shown) exiting through die holes 24 of the die 14 which open onto the surface portion 22 of the die face 20.

To assure accurate cutting of the chilled (by water) polymer streams into pellets, the shaft 18 must be accurately positioned in such a manner as to be as "true" perpendicular to the die face 20 as possible to ensure even wear of the cutter blades and/or even wear on the die face as well as to ensure production of pellets of uniform size.

Probes presently used for determining the position of a shaft 18 relative to a die face 20 do not accurately determine the position of the die face 20 because polymer drool (not shown) of low viscosity molten polymers adheres to the die face 20 such that the probe rides over the drool rather than on the die face 20. This causes uneven readings (determinations) of die face position resulting in inaccurate positioning of the shaft 18 on which the cutter blades are mounted. The cutter blades then travel in a slightly eccentric or skewed path rather than a truly circular path at or adjacent the die face 20 as a result of non-perpendicularity of the shaft 18 to the die face 20.

According to the teachings of the present invention, the problem of buildup of polymer drool on a die face 20 resulting in erroneous sensing of the position of the die face is minimized, if not altogether obviated, by use of an alignment jig 26 which is constructed according to the teachings of the present invention, which is mountable on the shaft 18 and which provides a fairly true measurement of perpendicularity of the shaft 18 to the die face 20.

Typically, the plane of the die face 20 is generally vertical and the shaft 18 extends generally horizontally so as to be perpendicular to the die face 20. A conventional adjustment mechanism (not shown) is provided for adjusting the three dimensional angular alignment (skew/perpendicularity) of the shaft 18 relative to the die face 20 so that the shaft 18 can be positioned perpendicular to the die face 20.

The jig 26 is mounted on the shaft 18 in a manner similar to the manner in which a cutter assembly with cutter blades thereon is mounted on the shaft 18.

The jig 26 comprises a hub portion 32, including two C-shaped sections 33 and 34 which are adapted to be received over and attached to the rotating shaft 18 by means of screws or bolts 35.

Figure 4:
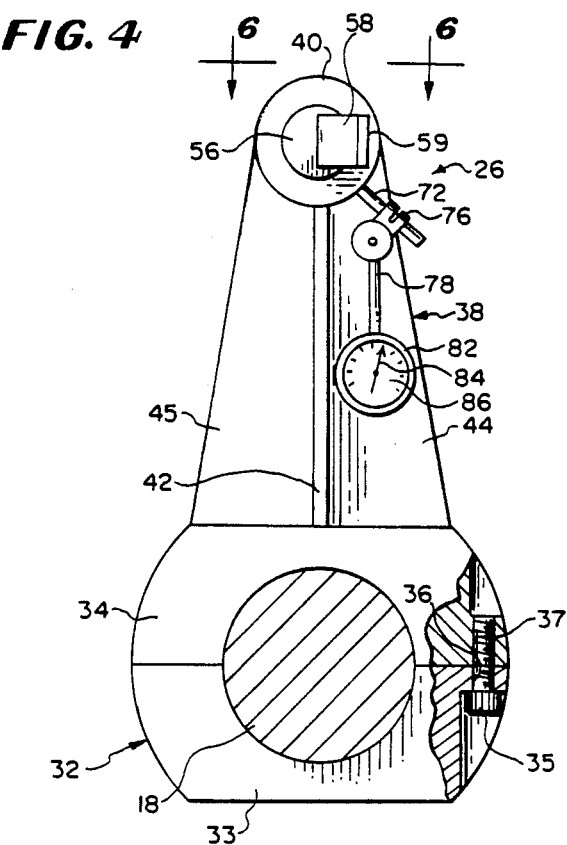
FIG. 4 is a front view of the alignment jig in FIG. 2 and is taken along line 4—4 of FIG. 2.

The bolts 35 are received in bores 36 (FIG. 4) in section 33 of the hub 32 and extend therethrough into threaded bores 37 (FIG. 4) in section 34 of the hub 32 to hold the two sections 33 and 34 together and secure the hub 32 around the rotatable shaft 18.

Extending radially outwardly from the hub 32 is an arm 38 having a generally cylindrical boss or distal end portion 40. The boss or distal end portion 40 has a throughbore 41 which has an axis parallel to the axis of the shaft 18.

The arm 40 and hub 32 are formed as an integral casting with the arm 40 including a first pair of plate-like ribs 42 and 43 coplanar with the axis of the shaft 18 and a second pair of plate-like ribs 44 and 45 lying in a plane transverse to, e.g. 90° C. to the plate-like ribs 42 and 43. The boss 40 is integral with the outer ends of the ribs 42–45.

Figure 2:
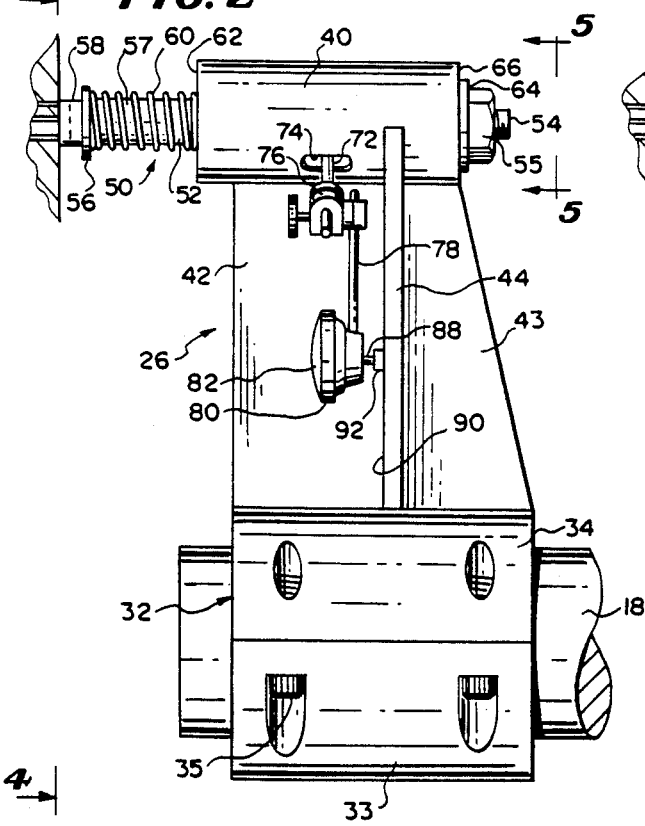
FIG. 2 is an enlarged side view of the alignment jig shown in FIG. 1.
Figure 3:
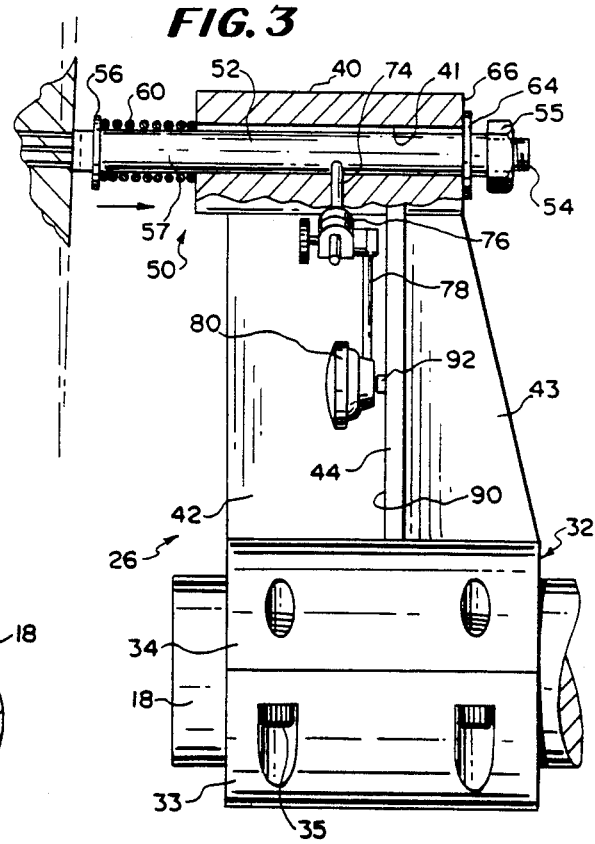
FIG. 3 is a side view of the alignment jig similar to the view shown in FIG. 2, with portions broken away and shows the position of the cutting/sensing assembly when the portion of the die face over which the assembly is travelling is angled toward the cutter shaft of the assembly.
Figure 6:
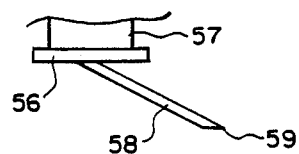
FIG. 6 is a partial top view of a scraping/sensing cutter blade of the alignment jig shown in FIG. 4 and is taken along line 6—6 of FIG. 4.

As best illustrated in FIGS. 2 and 3, a scraping/sensing assembly 50 is mounted in the boss 40. The assembly 50 includes a rod 52, which is received in the throughbore 41. Further the rod 52 has disc 56 fixed (such as by welding) to a forward end 57 thereof and the disc 56 has a cutter/scraping blade 58 fixed thereto (such as by welding). The rod 52 has a rearward end 54 which is screw threaded as shown and which has a steel nut 55 received thereon. The scraping blade 58 has a cutting/scraping edge 59 at the outer end thereof and extends angularly outwardly from the disc 56 as best shown in FIG. 6. A biasing spring 60 is positioned around the forward end 57 of the rod 52 between the disc 56 and a front face 62 of the boss 40.

The nut 55 provides a means for increasing or decreasing compression of the biasing spring 60 and a washer 64 is positioned between the nut 55 and a back face 66 of the boss 40.

The jig 26 is preferably made of aluminum. The washer 64, is made of steel and acts as a cushion against which the nut 55 bears. Without the washer 64, tightening of the nut 55 against the back face 66 of the boss 40 to provide increased compression of the spring 60, would cause gouging of the aluminum jig 26.

Figure 5:
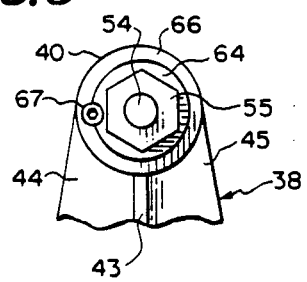
FIG. 5 is a partial rear view of the of the alignment jig shown in FIG. 4 and is taken along line 5—5 of FIG. 2.

To prevent turning of the washer 64 a set screw 67 is fixed in a bore in the rear face 66 and over or in engagement with an edge of the washer 64 as shown in FIG. 5.

As best shown in FIGS. 2 and 3, the rod 52 has a pin 72 extending laterally and radially outwardly from the rod 52. This pin 72 extends through an elongate or oval shaped slot 74 in the side of the boss 40.

A bracket or clamp 76 is releasably fixed to the distal end of the pin 72 and has a bar 78 extending downwardly therefrom as shown.

At the outer or distal end of the bar 78 is a gauge 80 which has a visual display 82. The visual display 82 is in the form of a pointer 84 positioned for rotation on a dial face 86. On the back side of the gauge 80 is a sensor pin 88 which is adapted to bear against a front face 90 of the rib 44. If desired, and as shown in FIGS. 1–3, the sensor pin 88 actually bears against a small boss 92 on the front face 90 of the rib 44. The small boss 92 can have a recess therein (not shown) for receiving and aligning the sensor pin 88.

In the use of the jig 26, a cutter assembly that is normally mounted on the end of the shaft 18 is taken off the shaft 18 and the jig 26 is mounted in place thereof. Then the scraper/sensor assembly 50 is adjusted to adjust the compression of the spring 60 against the disc 56. The scraping edge 59 of the blade 58 is then positioned to travel on the surface area 22 of the die face 20 in the area of the die holes 24.

It will be appreciated that this scraping edge 59 serves as a position sensor in that as the shaft 18 is rotated the scraping edge 59 scrapes away any polymer drool on the die face until it is in constant contact with the die face 20 in the area 22 of the holes 24 to indicate or sense the exact location of the die face 20 relative to the shaft 18 as the shaft 18 is rotated.

It is desirable that the shaft 18 be as true to perpendicular to the die face 20 as is physically possible and the jig 26 enables one to align the shaft 18 as true to perpendicular as possible to the die face 20. As stated above a conventional adjustment mechanism (not shown) is provided for adjusting the skew or perpendicularity of the shaft 18 relative to the die face 20.

As the shaft 18 is rotated the scraping edge 59 will scrape off any polymer drool that might be on the die face 20 thereby so that the scraping edge 59 is in constant continuous contact with the die face 20. Then if the shaft 18 is not truly perpendicular to the die face 20, the rod 52 will move inwardly or outwardly of the throughbore 41 as the jig 26 is rotated. This inward and outward movement will cause movement of the pin 72 in the slot 74 toward or away from the die face 20. Movement of the pin 72 is translated or transferred to the gauge 80 and the sensor pin 88 thereof which will be caused to move in and out of the back side of the gauge 80. Such inward or outward movement of the sensor pin 88 will then be indicated by movement of the pointer 84 on the dial 86 of the visual display 82.

Such movement and the direction of movement of the pointer 84 is noted and appropriate adjustments are then made to the skew adjusting mechanism for the shaft 18. Typically, only a small adjustment will be made and then another rotation of the jig 26 will be made to see if further adjustment is needed until there is essentially no movement of the pointer 84 indicating true perpendicularity of the shaft 18 to the die face 20.

Once accurate positioning of the shaft 18 relative to the die face 20 has been achieved, the jig 26 is removed and the cutter assembly is remounted on the end of the shaft and pelletizing can commence. It will be noted that the jig 26 is only utilized during startup procedures for initial alignment of the shaft 18 relative to the die face 20.

As shown, the length of the arm 38 is such that the scraper/cutter blade 58 rides on the die face 20 only in the area 22 where the die holes 24 are located.

The scraping edge 59 can be referred to as a unidirectional scraping edge which only scrapes in one direction. In the illustrated embodiment, scraping edge 59 moves in a forward direction or leading direction and this will be a counterclockwise direction on the die face facing the die face 20.

It will be understood, of course, that the blade 58 could be mounted on the jig 26 for rotation in a clockwise direction on the die face 20. The particular direction of movement of the scraper/cutter blade 58 will depend upon the usual rotation of the shaft 18 of the pelletizer 10.

Also it will be appreciated that various types of indicating means other than a gauge 80 mounted on the pin 72 can be utilized for indicating movement of the rod 52 in the throughbore 41.

Further it will be understood that if there is much polymer drool on the die face 20 in the area 22 the jig 26 will be rotated several times until the operator is certain that the drool has been completely scraped off so that the cutting edge 59 is making constant contact with the die face 20.

In a preferred method of using the jig 26, the jig 26 is first mounted on the shaft 18 of the pelletizer 10. Then the die face 20 is heated as it would be in preparing to cut molten plastic being extruded from the holes 24 into pellets. The compression spring 60 is then compressed and the scraping edge 59 positioned about ⅛ inch from the die face 20.

After the jig 26 is secured on the shaft 18 the nut 55 is rotated to reduce the compression of the spring to a degree where the scraping edge 59 is in contact with the die face 20 in the area 22. The shaft 18 is then rotated to cause the scraping edge 59 to travel in a circular path in the area 22 along and on the die face 20. The scrapping or cutting edge 59 then cuts away the polymer drool from the die face 20 and the spring 60, of course, forces the cutting edge or scraping edge 59 against the die face 20.

Once all the polymer drool has been scraped off, the nut 55 can be loosened to allow movement of rod 52 in throughbore 41. Then an operator will note any movement of the pointer 84 as the jig 26 is rotated and the amount and direction of movement of the pointer 84 is utilized in determining what adjustments need to be made to correct the perpendicularity of the shaft 18 relative to the die face 20.

Reading of movement of the pointer 84 is repeated and further adjustments are made to the skew or perpendicularity of the shaft 18 until the pointer 84 ceases to move during a complete revolution of the jig 26 about the axis of the shaft 18. When this condition has been reached, the operator will know that the shaft 18 is truly perpendicular to the die face 20 and the jig 26 then can be removed to allow the cutter assembly to be mounted on the end of the shaft 18.

The blade 58 typically has a width of 1¼ inches such that the width of the circular path or area 22 is approximately 1¼ inches.

It will be apparent that the alignment jig 26 provides a relatively simple mechanism for sensing perpendicularity of the shaft 18 to the die face 20. This is facilitated by the spring biased mounting of the rod 52 in the throughbore 41 such that the rod 52 can move in and out of the throughbore 41 as best shown in FIG. 3. For this purpose, it is understood that once the scraping edge 59 is in constant contact with the die face 20, the nut 55 will be loosened so that the rod 52 can move axially inwardly and outwardly of the throughbore 41.

From the foregoing description it will be apparent that the alignment jig 26 of the present invention has a number of advantages some of which have been described above and others of which are inherent in the invention. Also, it will be understood that modifications can be made to the alignment device of the present invention without departing from the teachings of the present invention. Accordingly, the scope of the invention is only to be limited as necessitated by the accompanying claims.

I claim:

1. For use in a pelletizer having a die assembly with a die face through which fluid polymer flows under pressure and a cutter assembly mountable on a rotating shaft and positionable at or adjacent to the die face with cutting blades thereof positioned closely adjacent to or at the die face for cutting pellets from the polymer material flowing through holes in the die: a cutter assembly alignment jig comprising a hub mountable on the rotatable shaft for the cutter assembly; an arm extending radially outwardly from said hub to a distal end portion of said arm; said distal end portion having a throughbore extending therethrough; said throughbore having an axis parallel to the axis of the shaft of the cutter assembly; a rod received in said throughbore; means for resiliently biasing said rod toward said die face; and scraping/sensing means mounted on a forward end of said rod and having a scraping edge contacting the die face for scraping drool of polymer material off the die face and for sensing the portion of the die face, such that the continuous contact of said scraping edge with the die face facilitates accurate measuring of the perpendicularity of the rotatable shaft to the plane of the die face.

2. The alignment jig of claim 1 being fabricated of aluminum.

3. The alignment jig of claim 1 wherein said hub comprises two C-shaped halves with said arm extending from one of said halves and said halves being secured together around the rotatabale shaft.

4. The alignment jig of claim 1 wherein said arm has a length generally equal to the radius of a circle passing through the area on the die face on which die holes open so that said scraping/sensing means travel in a circular path over the die holes in the die face.

5. The alignment jig of claim 1 wherein said rod has a rearward end which is screw threaded and which extends rearwardly out of said throughbore and a nut is mounted on and threadedly movable on said screw threaded rearward end of said rod for adjusting the distance said rod extends out of said throughbore toward the die face.

6. The alignment jig of claim 5 wherein a washer is positioned between said nut and a rearward face on said distal end portion of said arm.

7. The alignment jig of claim 6 wherein said washer is secured to said rearward face on said distal end portion of said arm to prevent gouging of said rearward face.

8. The alignment jig of claim 1 wherein said resilient rod biasing means comprise a spring compressed between a forward face of said distal end portion of said arm and said forward end of said rod.

9. The alignment jig of claim 1 wherein said scraping edge is a unidirectional scraping edge on a member secured to said forward end of said rod.

10. The alignment jig of claim 9 wherein said scraping edge is positioned to be a forward or leading edge relative to the rotation of the shaft.

11. The alignment jig of claim 9 wherein said member comprises a cutter knife blade.

12. The alignment jig of claim 1 wherein said distal end portion of said arm has a slot therein communicating with said throughbore and said rod has a position indicating pin extending radially therefrom through said slot and being movable axially of said jig in said slot for indicating the position of said rod as it travels over said die face.

13. The alignment jig of claim 12 including indicating means coupled to said pin and being operable to indicate minute movement of said pin in said slot as said rod travels over the die face.

14. The alignment jig of claim 13 wherein said indicating means comprise a fixture adjustably fixed to said pin and a gauge mounted on said fixture and having a pressure responsive member positioned against a surface of said arm and visual display means which are operable, in response to changes in pressure applied to said pressure responsive member as a result of movement of said pin in said slot, to indicate changes in position of said scraping/sensing means relative to the die face.

15. A method for using a cutter assembly alignment jig of the type comprising: a hub mountable on the rotatable shaft for the cutter assembly; an arm extending radially outwardly from said hub to a distal end portion of said arm; said distal end portion having a throughbore extending therethrough; said throughbore having an axis parallel to the axis of the shaft of the cutter assembly; a rod received in said throughbore; means for resiliently biasing said rod toward said die face; and scraping/sensing means mounted on on a forward end of said rod and having a scraping edge contacting the die face for scraping drool of polymer material off the die face and for sensing the portion of the die face such that the continuous contact of said scraping edge with the die face facilitates accurate measuring of the perpendicularity of the rotatable shaft to the plane of the die face, said method including the steps of:

(a) heating the die face;
(b) mounting said jig on said cutter assembly shaft;
(c) holding said rod away from the die face against the action of said biasing means;
(d) positioning the jig so that said scraping edge is approximately ⅛ inch from the die face;
(e) securing the jig to the shaft;
(f) releasing said rod so that said biasing means bias said scraping edge toward the die face to bring the scraping edge against the die face;
(g) rotating the shaft and jig thereon to determine if the shaft is "true" perpendicular relative to the plane of the die face;
(h) recording changes in movement of said rod toward or away from the die face;
(i) determining generally the radial direction of the skew of the shaft;
(j) determining the direction and distance which the shaft should be moved relative to the die face to provide a truer perpendicularity of the shaft to the plane of the die face;
(k) holding the rod away from the heated die face against the action of the biasing means;
(l) making a small adjustment of the position of the shaft toward a determined new position thereof providing a "truer" perpendicularity of the shaft to the plane of the die face; and
(m) repeating steps (f) through (l) until a substantially continuous constant position indication is sensed by said scraping/sensing means which indicates a true perpendicularity of the shaft to the plane of the die face.

* * * * *